(12) United States Patent
Gopi

(10) Patent No.: US 9,910,616 B2
(45) Date of Patent: Mar. 6, 2018

(54) DYNAMIC DATA ACCESS

(71) Applicant: SAP SE, Walldorf (DE)

(72) Inventor: Ajalesh Puthenparambil Gopi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/097,362

(22) Filed: Apr. 13, 2016

(65) Prior Publication Data
US 2017/0300265 A1   Oct. 19, 2017

(51) Int. Cl.
*G06F 12/10* (2016.01)
*G06F 3/06* (2006.01)
*G06F 17/30* (2006.01)

(52) U.S. Cl.
CPC .......... *G06F 3/0637* (2013.01); *G06F 3/0617* (2013.01); *G06F 3/0653* (2013.01); *G06F 3/0679* (2013.01); *G06F 17/30979* (2013.01)

(58) Field of Classification Search
CPC .............................. G06F 3/0637; G06F 3/0679
USPC ......................................................... 711/163
See application file for complete search history.

(56) References Cited

U.S. PATENT DOCUMENTS

2003/0159003 A1 * 8/2003 Gaskins ................ G06F 12/125
711/128

* cited by examiner

*Primary Examiner* — Jae Yu

(57) ABSTRACT

In dynamic data access, a request is received to access data of a core data service view of an in-memory database. It is determined that an aging temperature parameter is specified in an annotation in a core data service view definition. An aging temperature value corresponding to the aging temperature parameter is received as a range restriction. A default access behavior associated with the core data service view definition is overridden. A partition where the aging temperature value lies in a secondary memory is determined. Latest or recent partition in the secondary memory is referred to as a latest partition. Data from the latest partition until the determined partition is accessed in the secondary memory. The accessed data is loaded from the secondary memory to the main memory.

18 Claims, 10 Drawing Sheets

```
1  @Catalog.sqlViewName : 'SAMPLE FLIGHT'
2  @EndUserText.label :  'CDS  example for SAMPLE FLIGHT'
3  define view cds_sflight as select from t_sflight {
4    key t_sflight.carrierid,
5    key t_sflight.connectionid,
6    t_sflight.flightdate
7
8  }
```

FIG. 2A

```
1   @Catalog.sqlViewName : 'SAMPLE FLIGHT'
2   @EndUserText.label : 'CDS example for SAMPLE FLIGHT'
3   DataAging.agingTemperature :CURRENT:
4
5   define view cds_sflight as select from t_sflight
6   {
7     key t_sflight.carrierid,
8     key t_sflight.connectionid,
9     t_sflight.flightdate
10  }
```

FIG. 3A

```
1  @Catalog.sqlViewName : 'SAMPLE FLIGHT'
2  @EndUserText.label : 'CDS example for SAMPLE FLIGHT'
3  define view cds_sflight
4  with parameters PARAM_TEMP : Aging_Temperature_Value
5  as select from t_sflight {
6      key t_sflight.carrierid,
7      key t_sflight.connectionid,
8      t_sflight.flightdate
9
10     with RANGE_RESTRICTION ( $parameters.PARAM_TEMP )
11 }
```

FIG. 4A

DYNAMIC DATA ACCESS

FIELD

Illustrated embodiments generally relate to data processing, and more particularly to a system to perform dynamic data access.

BACKGROUND

Some enterprise applications process large volumes of a variety of data referred to as big data. Handling big data is challenging because of the sheer volume and integration of big data with existing enterprise applications. In order to gain more working memory and to better manage data storage, a data aging process is performed on data. The data aging process involves temporarily storing frequently accessed data in volatile memory where the data can be accessed for processing and moving less frequently used data from the volatile memory to a non-volatile memory. "Access behavior" is a rule in an enterprise application that defines whether data is to be accessed from the volatile memory or the non-volatile memory. Some application artifacts such as "views" do not have an access behavior. When a request is received to access data associated with such an application artifact, it is challenging to dynamically control the way data is accessed.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 2A is a code snippet illustrating definition of CDS view, according to one embodiment.

FIG. 3A is a code snippet illustrating definition of CDS view, according to one embodiment.

FIG. 4A is a code snippet illustrating definition of CDS view, according to one embodiment.

DETAILED DESCRIPTION

Embodiments of techniques for dynamic data access of data aging aware data are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
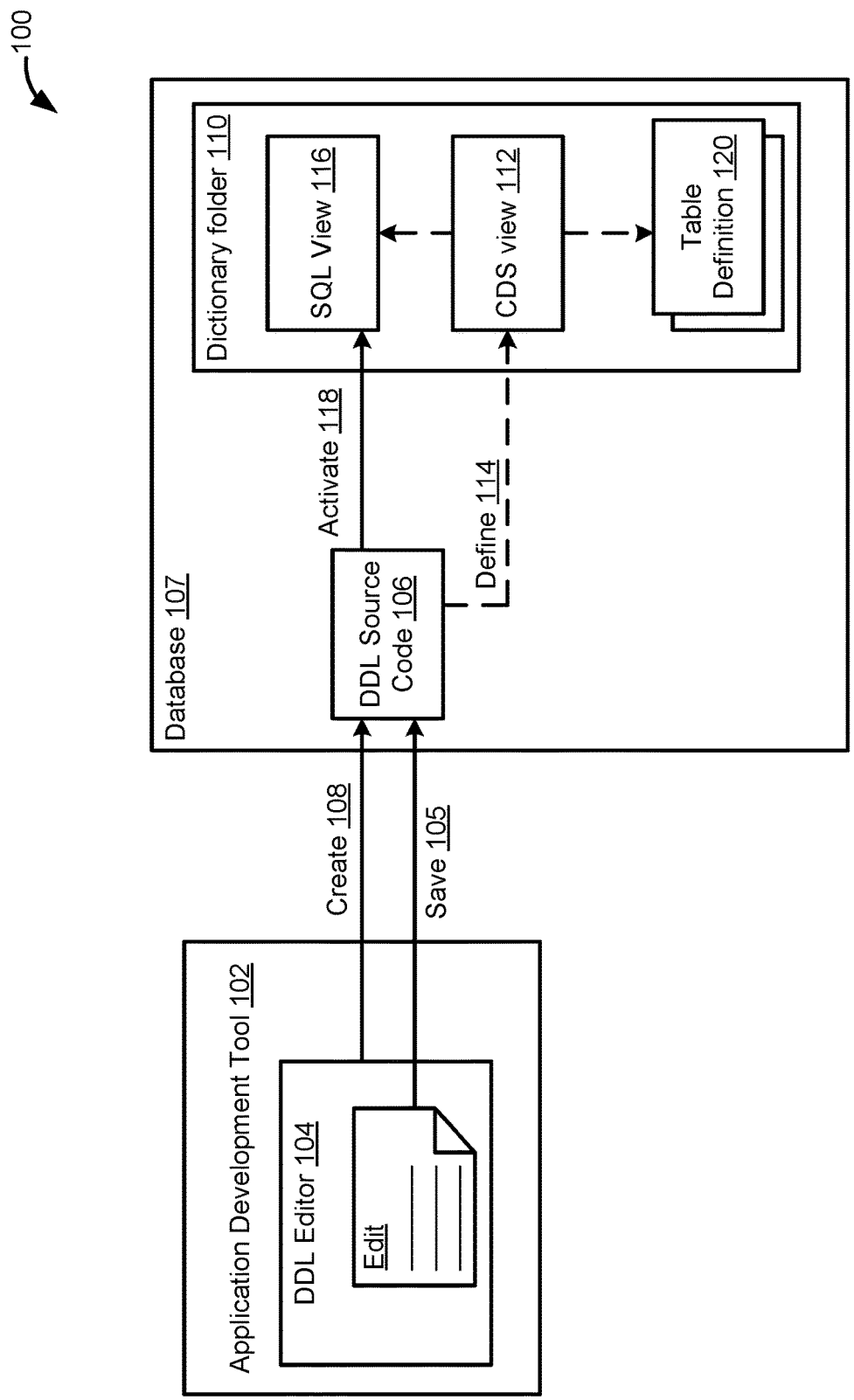
FIG. 1 is a block diagram illustrating architecture of various components for data aging aware data access, according to one embodiment.

FIG. 1 is a block diagram illustrating architecture 100 of various components in a dynamic data access environment, according to one embodiment. The architecture 100 is shown containing application development tool 102 with data definition language (DDL) editor 104. Data definition language or data description language is syntax for defining data structures such as database schemas. The DDL editor 104 is used to create and save DDL source code 106 in database 107. The database 107 may be an in-memory database, for example SAP Hana® where data is stored in a volatile memory such as a random access memory (RAM). When a create command is received from a user, in the DDL editor 104, the DDL source code 106 is created. Create command 108 is a result of the create command received from the user. Based on the create command 108, an inactive version of the DDL source code 106 is created in a package (not shown) selected by the user. Inactive version of the DDL source code 106 refers to a working copy or draft copy of the DDL source code 106. When a save command is received from the user, in the DDL editor 104, the created DDL source code 106 is saved in the database 107. Save command 105 is a result of the save command received from the user. Based on the save command 105, the DDL source code 106 is saved in the database 107. The DDL source code 106 is added in dictionary folder 110 of the selected package. Database independent data model definition entity such as core data services (CDS) is used in this architecture. CDS is an infrastructure in SAP Hana® that can be used to create data models. CDS data models include objects such as tables, views, etc. The DDL source code 106 is used to define core data service (CDS) view 112. The CDS view 112 is a design-time file, and is represented as a projection of database tables. View generated in the database independent data model definition entity such as CDS view is generated based on DDL source code. The CDS and CDS view explained above are merely exemplary, however, various other database independent data model definition entities may be used.

A define command is received from the user in the DDL editor 104 to define a CDS view. Define command 114 is a result of the define command received from the user in the DDL editor. Based on the define command 114, CDS view 112 is defined. CDS view 112 may be a projection on a relational database table or a projection on other view. For the CDS view 112 defined in the DDL source code 106, SQL view 116 is generated in the dictionary folder 110, based on activate command 118 received from the user. Active version of the DDL source code 106 refers to a published copy or version of the DDL source code 106 that can be used by other services or applications. Dictionary folder 110 describes logical structure of the objects used in application development and shows the mapping with the underlying database in tables or views. The dictionary folder 110 is shown containing table definition 120. Based on the table definition 120, tables with the same structure can be created in the underlying database 107.

FIG. 2A is code snippet 200A illustrating definition of a CDS view, according to one embodiment. CDS supports built-in annotation such as @catalog, @schema, etc., and user defined custom annotations to define CDS compliant catalog objects. Built-in annotations such as catalog and schema are syntax used to specify metadata in CDS. Code snippet 200A shows a definition of CDS view for flight selection based on attributes such as carrier id, connection id and flight date. The CDS view is defined in a DDL editor, and code snippet 200A is referred to as a DDL source code. Line of code 202 shows a catalog annotation defining SQL view name as 'SAMPLE FLIGHT'. Line of code 204 shows a custom annotation-defining label as 'CDS example for SAMPLE FLIGHT'. In line of code 206, a CDS view is defined using keywords 'define view' followed by a CDS view name 'cds_sflight'. The CDS view 'cds_sflight' is selected from a table 't_sflight' based on attributes carrier id, connection id, and flight date. A query to select attributes 't_sflight.carrierid', 't_sflight.connectionid', and 't_sflight.flightdate' from the table 't_sflight' is shown in lines of code 206 to 212. Attributes key 't_sflight.carrierid' and key 't_sflight.connectionid' indicated with a prefix 'key' are referred to as key elements or key attributes. The key attributes represent the primary key columns in the table. Access behavior specifying a memory location from where data is to be accessed is not defined in the code snippet 200A. When code snippet 200A is executed, the CDS view is generated with flight details such as carrier id, connection id and flight date.

Figure 2B:
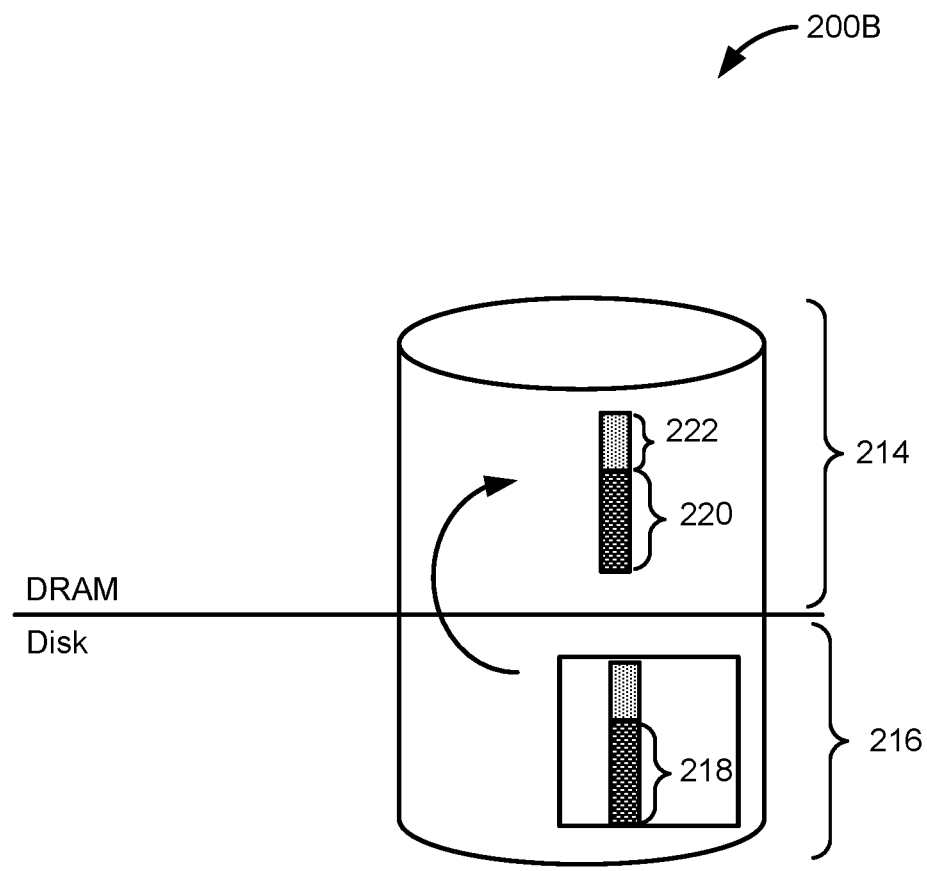
FIG. 2B is a block diagram illustrating default access behavior of CDS view, according to one embodiment.

FIG. 2B is block diagram 200B illustrating a default access behavior of CDS view, according to one embodiment. In-memory database may be executed using multi-core CPU's with quick processing between the processor cores, and contains terabytes of main memory or random access memory (RAM). Traditionally, a database table is a two-dimensional data structure with fields organized in rows and columns. However, in the in-memory database, memory organization is linear. In a linear memory organization, data may be stored as a row store or a column store. In a row store, the fields of a row of the table are stored sequentially, whereas in a column store, the fields of a column are stored sequentially, in contiguous memory locations.

Section 214 represents the in-memory database storage, where a dynamic random access memory (DRAM) that is a type of RAM is used for storage. DRAM is a volatile memory that requires power to maintain the stored information. Data stored in the storage area of DRAM or main memory is referred to as current data or hot data. Section 216 represents an auxiliary memory or secondary memory that is a non-volatile memory. Some examples of secondary memory are flash memory, optical disc, magnetic disk, etc. Data stored in the storage area of secondary memory are referred to as historical data or cold data. Accessing data stored in secondary memory is relatively slower compared to data stored in main memory. Data aging refers to a technology of moving less relevant data from main memory to the secondary memory.

When the code snippet 200A is executed, historical data associated with the attributes carrier id, connection id, and flight date are selected from table 't_sflight' stored in the section 216. Since access behavior is not defined in the code snippet 200A, a default access behavior of accessing data from the secondary memory is performed. In the default access behavior, data is accessed from a default memory location such as the secondary memory. Based on the query executed in the code snippet 200A, portion of historical data 218 is accessed, and loaded as section 220 in the main memory (section 214). Portion of current data 222 may be already available in the section 214. During execution of the code snippet 200A, since access behavior is not defined in the code snippet 200A, entire column of data associated with attributes carrier id, connection id, and flight date are accessed, and loaded from the section 216 in secondary memory to the section 214 in the main memory. For example, when an application invokes code snippet 200A to access the CDS view, the default access behavior is performed. In the default access behavior, entire data is accessed from the secondary memory, and loaded into the main memory.

FIG. 3A is code snippet 300A illustrating definition of a CDS view, according to one embodiment. Code snippet 300A shows a definition of CDS view for flight selection based on attributes such as carrier id, connection id and flight date. The code snippet 300A also enables overriding a default access behavior of accessing data, by specifying an annotation "data aging", defining an aging temperature. Line of code 302 shows a catalog annotation defining SQL view name as 'SAMPLE FLIGHT'. Line of code 304 shows a custom annotation defining label as 'CDS example for SAMPLE FLIGHT'. Line of code 306 shows a custom annotation "data aging", defining the aging temperature with an aging temperature value as 'CURRENT'. Since the annotation "data aging" defines the aging temperature value as 'current', current data will be accessed from a main memory, and the historical data from a secondary memory will not be accessed. The specified aging temperature value 'current', overrides the default access behavior of accessing entire data from secondary memory. The aging temperature value 'current' is specified in the code snippet defining the CDS view at design time i.e. before execution of the code snippet, and at runtime i.e. during execution of the code snippet, the default access behavior is overridden to access data from the main memory.

In line of code 308, a CDS view is defined using keywords 'define view' followed by a CDS view name 'cds_sflight'. The CDS view 'cds_sflight' is selected from a table 't_sflight' based on attributes carrier id, connection id, and flight date. A query to select attributes 't_sflight.carrierid', 't_sflight.connectionid', and 't_sflight.flightdate' from the table 't_sflight' is shown in lines of code 308 to 314. During execution of the code snippet 300A, since the aging temperature value is specified as 'current', current data corresponding to the attributes carrier id, connection id, and flight date from table 't_sflight' is accessed from the main memory. This overrides the default access behavior of accessing entire data from the secondary memory. Specifying the annotation with data aging temperature in the CDS view to override the default access behavior is performed at a database layer, thereby reducing programming effort in an application layer. For example, the annotation with data aging temperature specified in the CDS view to override default access behavior is performed in the in-memory database. The application accessing the CDS view does not have to be programmed to override the default access behavior.

If the custom annotation, data aging defining the aging temperature in line of code 306 is not specified, then the default access behavior as explained in FIG. 2A and FIG. 2B are executed. In one embodiment, if a custom annotation data aging defining aging temperature is specified with an aging temperature value 'historical', the historical data in the secondary memory will be accessed. The historical data will be loaded to the main memory from the secondary memory. In this scenario, the current data will remain in the main memory.

Figure 3B:
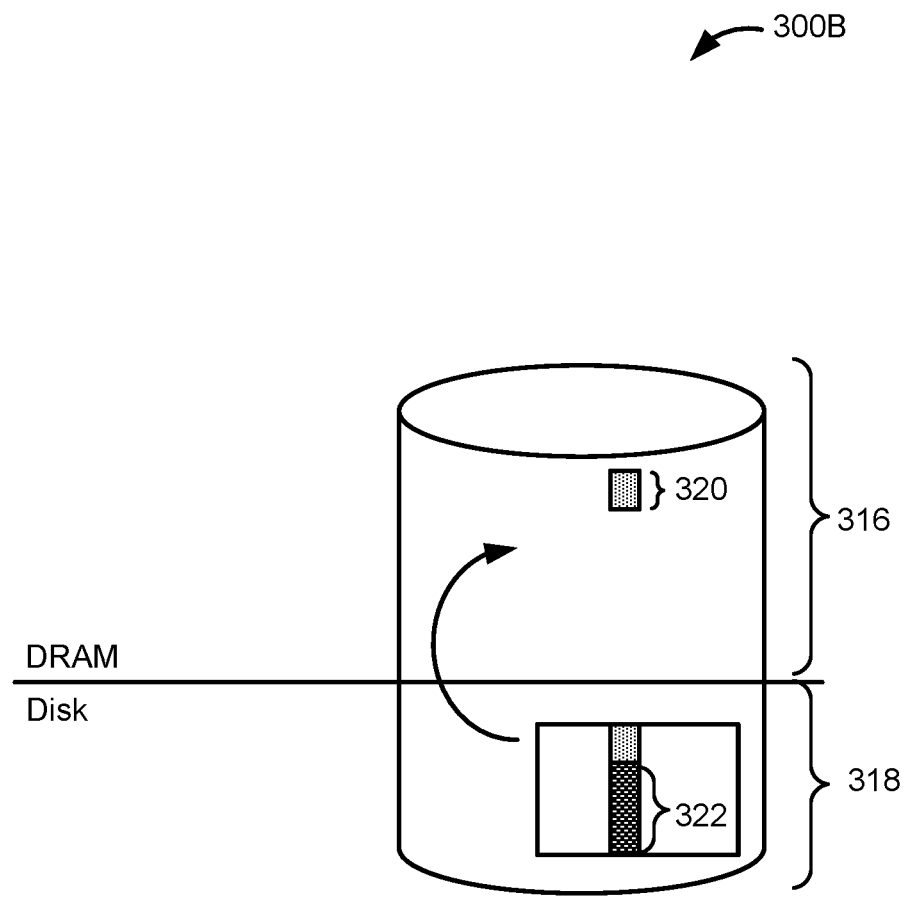
FIG. 3B is a block diagram illustrating overriding access behavior of CDS view, according to one embodiment.

FIG. 3B is a block diagram 300B illustrating overriding access behavior of a CDS view, according to one embodiment. Section 316 represents a dynamic random access memory (DRAM) or main memory that is volatile, and section 318 represents an auxiliary memory or secondary memory that is a non-volatile memory. When the code snippet 300A is executed, current data associated with attributes carrier id, connection id, and flight date are accessed from table 't_sflight' stored in the section 316 in the main memory. During execution of the code snippet 300A, since an aging temperature value 'current' is specified in the annotation "data aging", current data may be accessed from the main memory, and the historical data will not be accessed from the secondary memory. The specified aging temperature value 'current', overrides the default access behavior of accessing entire data from secondary memory. Portion of current data 320 indicates the current data in the main memory. Portion of historical data 322 is not accessed in the secondary memory because the overriding aging temperature value 'current' is specified. Overriding the default access behavior ensures that memory footprint is reduced. In the default access behavior, entire data is moved from the secondary memory to the main memory. However, when the default access behavior is overridden, selected data that is relatively lesser than the entire data is moved from the secondary memory to the main memory thereby reducing the memory footprint.

In one embodiment, during execution of the code snippet 300A, if an aging temperature value is specified as 'historical', historical data corresponding to the attributes carrier id, connection id, and flight date from table 't_sflight' is accessed from the secondary memory. In this scenario, current data will remain in the main memory. In one embodiment, during execution of the code snippet 300A, if access behavior is not defined in the code snippet 300A, entire column of data associated with attributes carrier id, connection id, and flight date are accessed, and loaded from the portion 318 in the secondary memory to the portion 316 in the main memory. If access behavior is not defined in the code snippet 300A, a default access behavior of accessing data from a default memory location such as secondary memory is performed.

FIG. 4A is a code snippet 400A illustrating definition of a CDS view, according to one embodiment. Code snippet 400A shows a definition of CDS view for flight selection based on attributes such as carrier id, connection id and flight date. The code snippet 400A also enables overriding a default access behavior of accessing data by specifying an annotation "data aging", defining an aging temperature value as a range restriction. Line of code 402 shows a catalog annotation defining SQL view name as 'SAMPLE FLIGHT'. Line of code 404 shows a custom annotation defining label as 'CDS example for SAMPLE FLIGHT'. In line of code 406 to 418, a CDS view is defined using keywords 'define view' followed by a CDS view name 'cds_sflight'. The CDS view 'cds_sflight' is selected from a table 't_sflight' based on attributes carrier id, connection id, and flight date. Lines of code 408 and 418 show a custom annotation, data aging, defining the aging temperature value. The aging temperature value can be received as an input from an application or function or program logic invoking the code snippet 400A. The CDS view 'cds_sflight' is selected with attributes 't_sflight.carrierid', 't_sflight.con-nectionid', and 't_sflight.flightdate' from a table 't_sflight', based on the aging temperature value received as input When the code snippet 400A is invoked to access the CDS view 'cds_sflight', and an aging temperature value '01.06.2014' is received as a range restriction, a query as shown below will be executed:

SELECT T_SFLIGHT.CARRIERID, T_SFLIGHT.CONNECTIONID, T_SFLIGHT.FLIGHTDATE FROM SCHEMA_X, T_SFLIGHT WITH RANGE_RESTRICTION ('01.06.2014')

When this query is executed, data in columns carrier id, connection id and flight date are accessed, and retrieved from the table t_sflight in a secondary memory. Data in the secondary memory is retrieved between a latest aging temperature date and a partition where the specified aging temperature value '01.06.2014' lies. The specified aging temperature value acts as a range restriction that restricts data until the specified aging temperature value.

Similarly, at runtime, the code snippet 400A is invoked to access the CDS view 'cds_sflight', and when an aging temperature value 'current' is received as a range restriction parameter, a query as shown below will be executed:

SELECT T_SFLIGHT.CARRIERID, T_SFLIGHT.CONNECTIONID, T_SFLIGHT.FLIGHTDATE FROM SCHEMA_X, T_SFLIGHT WITH RANGE_RESTRICTION ('CURRENT')

When this query is executed, data in columns carrier id, connection id and flight date are accessed from the table t_sflight in main memory. Secondary memory is not accessed because the specified temperature value 'current' acts as a range restriction parameter that restricts data to the main memory. In one embodiment, when the aging temperature value 'current' is not received as an input from an application or function or program logic invoking the code snippet 400A, data is accessed from a default memory location such as the secondary memory. If it is determined that the aging temperature value 'current' is received as the input, data is accessed from the main memory. The determination is performed using conditional statements.

Figure 4B:
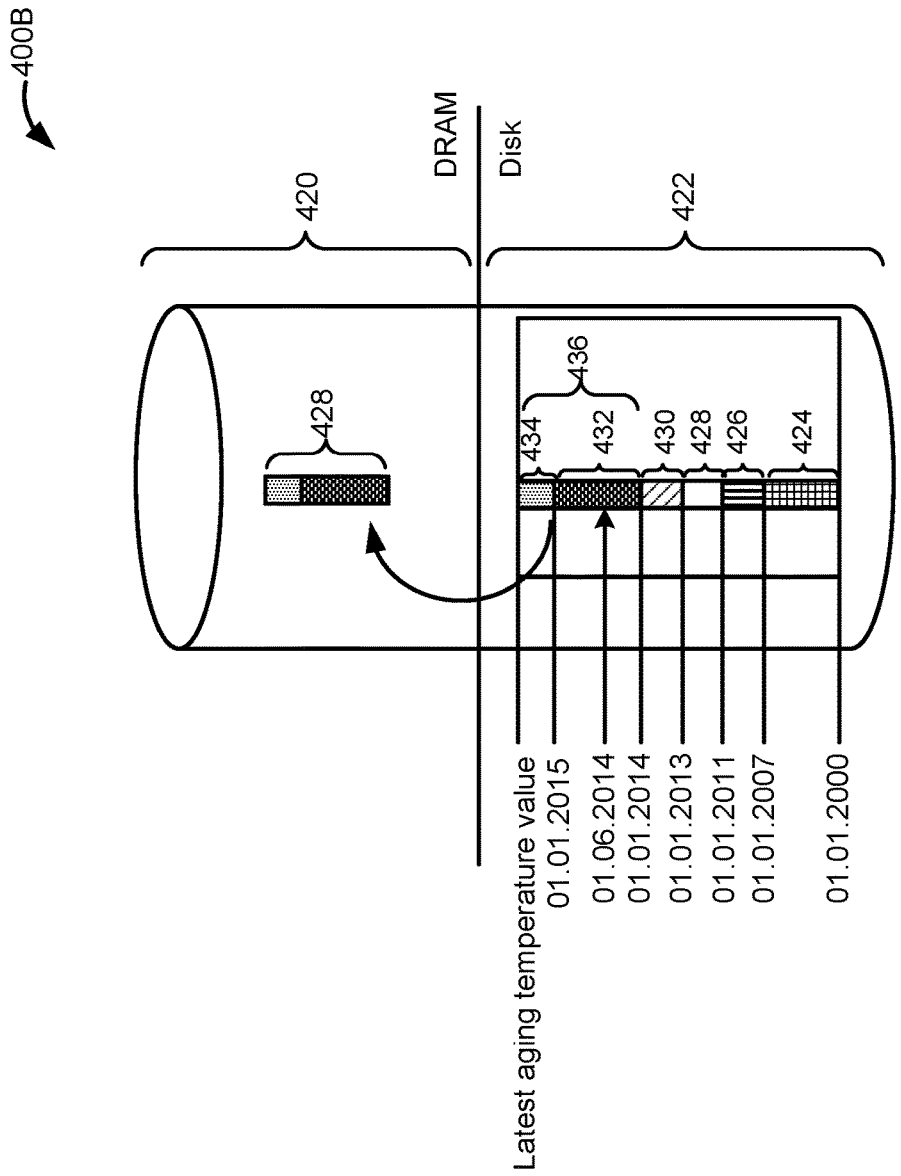
FIG. 4B is a block diagram illustrating overriding access behavior of CDS view, according to one embodiment.

FIG. 4B is a block diagram illustrating overriding access behavior of a CDS view, according to one embodiment. Section 420 represents a dynamic random access memory (DRAM) or main memory that is a volatile memory, and section 422 represents an auxiliary memory or secondary memory that is a non-volatile memory. When the code snippet 400A is executed, historical data associated with attributes carrier id, connection id, and flight date are accessed from table 't_sflight' stored in the section 422 in the secondary memory. Based on data aging concept less frequently used data was moved from section 420 to section 422. Data was moved from section 420 section 422 based on aging temperature values such as '01.01.2000', '01.01.2007', '01.01.2011', '01.01.2013' and '01.01.2014'. At aging temperature value '01.01.2000' partition 424 was moved from the main memory to the secondary memory. At aging temperature value '01.01.2007' partition 426 was moved from the main memory to the secondary memory. Similarly, at aging temperature '01.01.2011' partition 428, at aging temperature '01.01.2013' partition 430, at aging temperature '01.01.2014' partition 432, and at aging temperature value '01.01.2015' partition 434 are moved from the main memory to the secondary memory. When the code snippet 400A is invoked to access the CDS view 'cds_s- flight', and an aging temperature value '01.06.2014' is received as a range restriction parameter, historic data is accessed from the table t_sflight in the section 422 between a latest aging temperature date and the aging temperature value '01.06.2014'. Partition corresponding to the latest aging temperature date is referred to as latest partition 434. The received aging temperature value '01.06.2014' lies in the partition 432. Data is moved from main memory to the secondary memory, and the secondary memory to the main memory in the form of partitions. Accordingly, data in the latest partition 434 and identified partition 432 are identified as section 436. Section 436 is moved from the secondary memory to the primary memory. Historic data associated with attributes carrier id, connection id, and flight date are accessed from the table 't_sflight' from the section 436. Historic data from the section 436 is moved from the section 422 in the secondary memory to partition 428 in the section 420 in the main memory.

Figure 5:
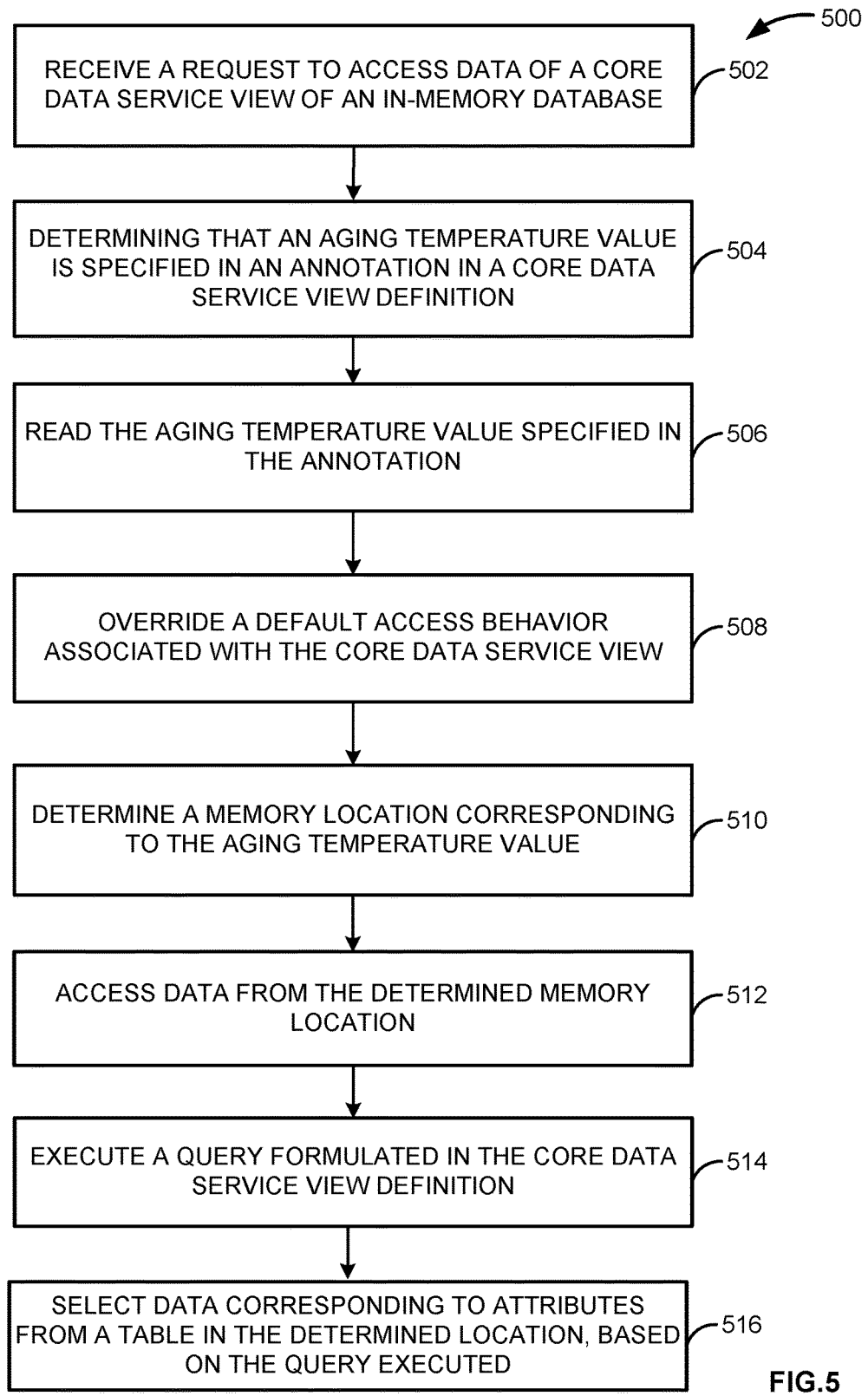
FIG. 5 is a flow diagram illustrating process of dynamic analysis of entities, according to one embodiment.

FIG. 5 is a flow diagram illustrating process 500 of dynamic data access, according to one embodiment. At 502, a request is received to access a data of a core data service view of an in-memory database. The view may be a core data service view that is a design-time file represented as a projection of database tables. At 504, it is determined that an aging temperature value is specified in an annotation in a core data service view definition. For example, the aging temperature value can be specified as 'current'. At 506, the aging temperature value specified in the annotation is read. For example, the aging temperature value 'current' is read. At 508, a default access behavior associated with the core data service view is overridden. Since the aging temperature value is specified as 'current', the default access behavior of accessing a secondary memory is overridden. At 510, a memory location in a main memory corresponding to the aging temperature value is determined. At 512, data is accessed from the determined main memory location. At 514, a query formulated in the core data service view definition is executed. At 516, when the query is executed, data corresponding to attributes is selected from a table. For example, when the query in the core data service view definition is executed, data corresponding to the attributes in the query is selected from the table in the main memory location.

Figure 6:
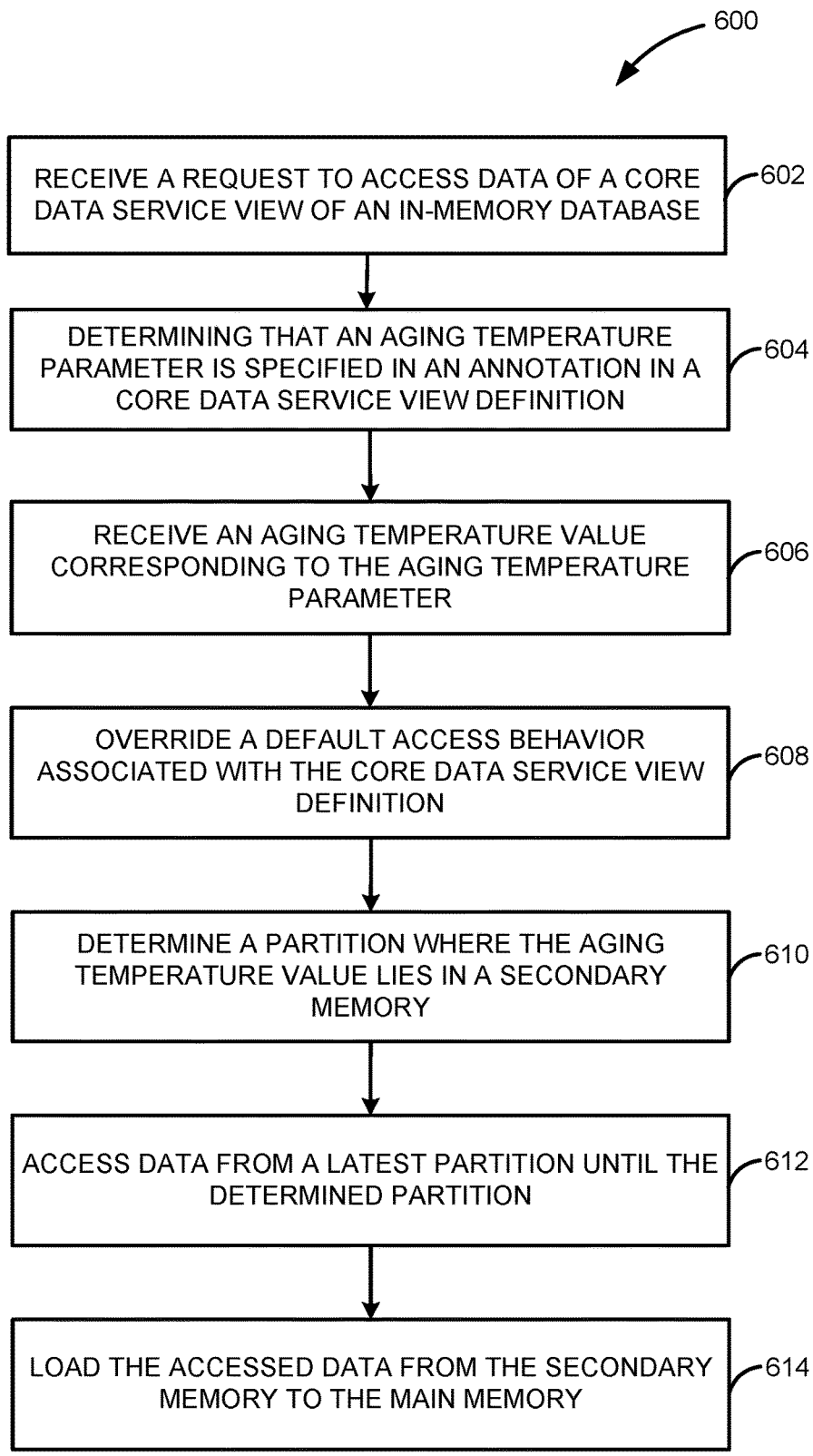
FIG. 6 is a flow diagram illustrating process of dynamic data access, according to one embodiment.

FIG. 6 is a flow diagram illustrating process 600 of dynamic data access, according to one embodiment. At 602, a request is received to access data of a core data service view of an in-memory database. At 604, it is determined that an aging temperature parameter is specified in an annotation in a core data service view definition. At 606, an aging temperature value corresponding to the aging temperature parameter is received. The received aging temperature value acts as a range restriction. For example, the aging temperature value can be specified as 'date x'. A partition corresponding to the specified 'date x' is determined. The aging temperature value 'date x' acts as the range restriction that restricts data until the determined partition. At 608, a default access behavior associated with the core data service view definition is overridden. Default data access defines that entire data is accessed from a secondary memory. Since, the aging temperature value is specified as 'date x', this overrides the default data access. At 610, a partition where the aging temperature value lies in a secondary memory is determined. For example, a partition where the aging temperature value 'date x' lies is determined as 'partition x'. At 612, data from a latest partition until the determined partition is accessed. For example, the most recently created partition in the secondary memory is referred to as a latest partition. Data from the latest partition until the 'partition x' is accessed in the secondary memory. At 614, the accessed data is loaded from the secondary memory to the main memory. The accessed data from the latest partition until the 'partition x' is loaded from the secondary memory to the main memory.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
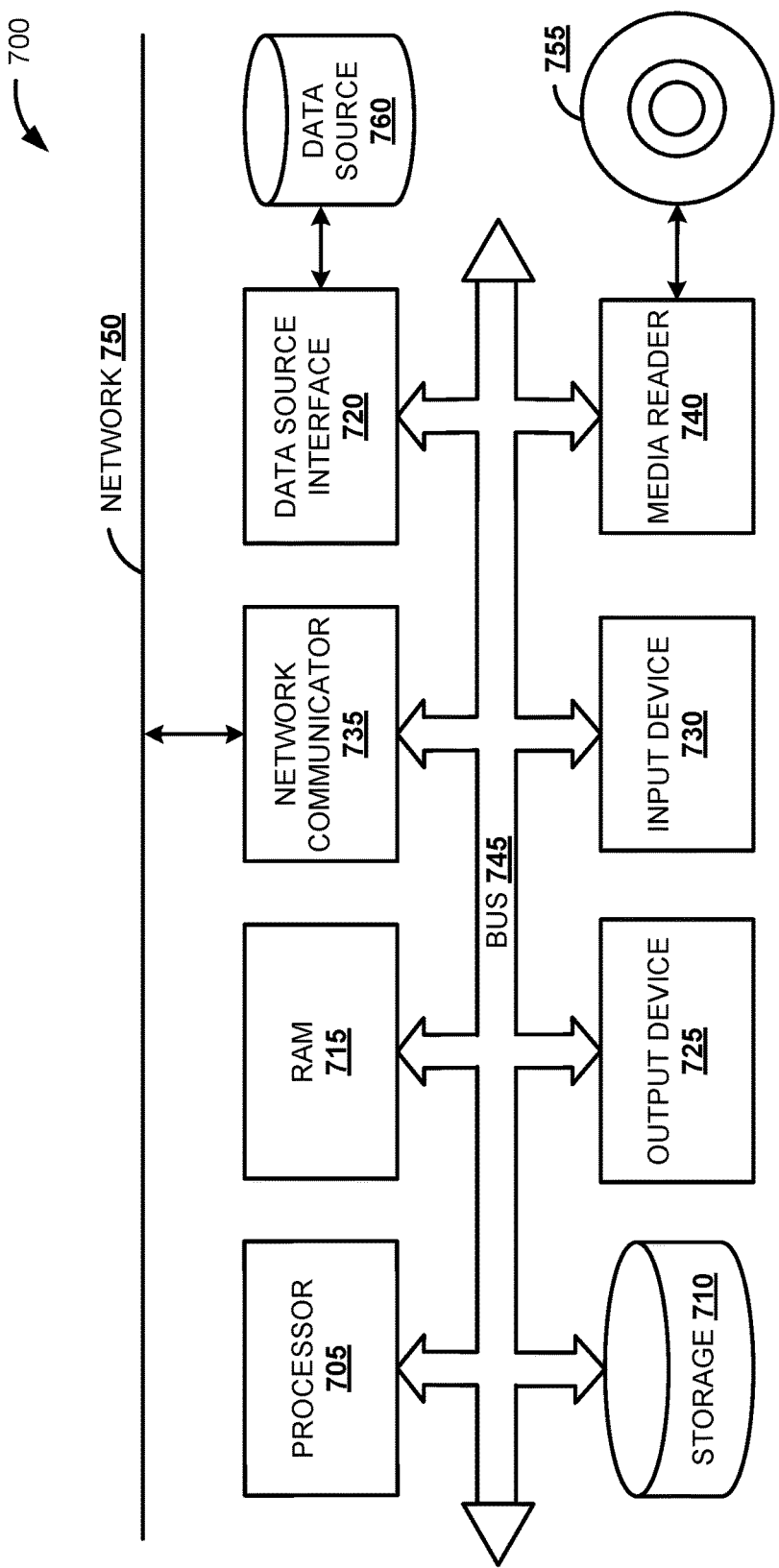
FIG. 7 is a block diagram illustrating an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   receive a request to access data of a core data service view of an in-memory database;
   determine that an aging temperature value is specified in an annotation in a core data service view definition, wherein the annotation represents a syntax specifying metadata and is a code snippet embedded in the core data service view definition;
   read the aging temperature value specified in the annotation;
   override a default access behavior associated with the core data service view;
   determine a memory location corresponding to the aging temperature value; and
   access data from the determined memory location.

2. The computer-readable medium of claim 1, further comprises instructions which when executed by the computer further causes the computer to:
   determine that the memory location is in a main memory.

3. The computer-readable medium of claim 2, wherein the main memory is a volatile random access memory.

4. The computer-readable medium of claim 1, further comprising instructions which when executed by the computer further causes the computer to:
   at runtime, execute a query formulated in the core data service view definition; and
   select data corresponding to attributes from a table, based on the query.

5. The computer-readable medium of claim 1, wherein the aging temperature value is a numerical data aging value.

6. The computer-readable medium of claim 1, wherein the code data service view is generated using data definition language.

7. A computer-implemented method of dynamic data access, the method comprising:
   receiving a request to access data of a core data service view of an in-memory database;
   determining that an aging temperature parameter is specified in an annotation in a core data service view definition, wherein the annotation represents a syntax specifying metadata and is a code snippet embedded in the core data service view definition;
   receiving an aging temperature value corresponding to the aging temperature parameter;
   overriding a default access behavior associated with the core data service view definition;
   determining a memory location corresponding to the received aging temperature value; and
   accessing data from the determined memory location.

8. The method of claim 7, wherein the memory location further comprising:
   at runtime, determining a partition where the aging temperature value lies in a secondary memory;
   accessing data from a latest partition until the determined partition; and loading the accessed data from the secondary memory to a main memory.

9. The method of claim 7, wherein the aging temperature value is a numerical data aging value.

10. The method of claim 7, wherein the core data service view is generated using data definition language.

11. The method of claim 7, further comprising:
   at runtime, executing a query formulated in the core data service view definition; and
   based on the query executed, selecting data corresponding to attributes from a table.

12. The method of claim 8, wherein the main memory is a volatile random access memory.

13. The computer system for dynamic data access, comprising:
   a computer memory to store program code; and
   a processor to execute the program code to:
      receive a request to access data of a core data service view of an in-memory database;
      determine that an aging temperature parameter is specified in an annotation in a core data service view definition, wherein the annotation represents a syntax specifying metadata and is a code snippet embedded in the core data service view definition;
      receive an aging temperature value corresponding to the aging temperature parameter;
      override a default access behavior associated with the core data service view definition;
      determine a memory location corresponding to the received aging temperature value; and
      access data from the determined memory location.

14. The system of claim 13, wherein the processor further executes the program code to:
   at runtime, determine a partition where the aging temperature value lies in a secondary memory;
   access data from a latest partition until the determined partition; and
   load the accessed data from the secondary memory to the main memory.

15. The system of claim 13, wherein the aging temperature value is a numerical data aging value.

16. The system of claim 13, wherein the core data service view is generated using data definition language.

17. The system of claim 13, wherein the processor further executes the program code to:
   at runtime, executing a query formulated in the core data service view definition; and
   based on the query executed, selecting data corresponding to attributes from a table.

18. The system of claim 14, wherein the main memory is a volatile random access memory.

* * * * *